(12) United States Patent
Allegri

(10) Patent No.: US 6,568,718 B1
(45) Date of Patent: May 27, 2003

(54) JUNCTION FOR FLEXIBLE TUBE FOR HIGH PRESSURE FLUIDS

(75) Inventor: Massimo Allegri, Sesto San Giovanni (IT)

(73) Assignee: Allegri Cesare S.p.A., Milan (IT)

( * ) Notice: Subject to any disclaimer, the term of this patent is extended or adjusted under 35 U.S.C. 154(b) by 0 days.

(21) Appl. No.: 09/611,213

(22) Filed: Jul. 6, 2000

(30) Foreign Application Priority Data

Jul. 8, 1999 (IT) .......................................... MI99A1497
May 8, 2000 (IT) .................................. MI2000A000992

(51) Int. Cl.⁷ ........................... F16L 17/00; F16L 19/00
(52) U.S. Cl. ........................... 285/354; 285/52; 285/55; 285/386
(58) Field of Search .......................... 285/354, 52, 386, 285/55

(56) References Cited

U.S. PATENT DOCUMENTS

| | | | | |
|---|---|---|---|---|
| 771,682 A | * | 10/1904 | Sussman | 285/331 |
| 1,862,920 A | * | 6/1932 | Boynton | 285/123.12 |
| 1,939,242 A | * | 12/1933 | Thaheld | 285/115 |
| 2,112,352 A | * | 3/1938 | Vetrano | 285/148.19 |
| 2,449,121 A | * | 9/1948 | Jones | 285/33 |
| 2,560,263 A | * | 7/1951 | Wiegand et al. | 285/266 |
| 3,332,709 A | * | 7/1967 | Kowalski | 285/23 |
| 3,338,597 A | * | 8/1967 | Mason | 285/52 |
| 3,635,499 A | * | 1/1972 | Reddy | 285/111 |
| 3,764,169 A | * | 10/1973 | St. Clair | 285/30 |
| 3,951,438 A | | 4/1976 | Scales | |
| 3,955,835 A | * | 5/1976 | Farrington | 285/175 |
| 4,369,992 A | | 1/1983 | Fournier | |
| 4,484,770 A | * | 11/1984 | Sloane | 285/55 |
| 4,595,218 A | * | 6/1986 | Carr et al. | 285/47 |
| 4,671,542 A | * | 6/1987 | Juchnowski | 285/174 |
| 4,801,158 A | * | 1/1989 | Gomi | 285/52 |
| 4,801,160 A | * | 1/1989 | Barrington | 285/81 |
| 4,861,076 A | * | 8/1989 | Newman et al. | 285/332.3 |
| 5,033,435 A | * | 7/1991 | Ostarello et al. | 123/469 |
| H945 H | * | 8/1991 | Taliaferro et al. | 285/354 |
| 5,192,095 A | | 3/1993 | Behrens | |
| 5,297,822 A | | 3/1994 | Sanders | |
| 5,308,122 A | * | 5/1994 | Crawford et al. | 285/52 |
| 5,503,438 A | * | 4/1996 | Swauger | 285/332.2 |
| 5,794,983 A | * | 8/1998 | Melvin | 285/55 |
| 5,890,746 A | | 4/1999 | Mueller | |
| 6,099,046 A | * | 8/2000 | Oh | 285/354 |
| 6,237,968 B1 | * | 5/2001 | Bohnes | 285/334.2 |

FOREIGN PATENT DOCUMENTS

DE 1105671 * 4/1961

OTHER PUBLICATIONS

EP search Report dated Nov. 20, 2000.

* cited by examiner

Primary Examiner—William Miller
Assistant Examiner—Carlos Lugo
(74) Attorney, Agent, or Firm—Hedman & Costigan, P.C.

(57) ABSTRACT

A junction for a flexible tube for high pressure fluids which comprises a sleeve pressed down onto the flexible tube, for coupling with a connection element of the flexible tube, where a female rotating threaded connection element is connected to the connection element. A threaded end element can be associated with the connection element of the flexible tube, wherein the hydraulic seal between the end element and the connection element is guaranteed through the coupling of truncated cone surfaces, provided at least on the end element, with an engagement element that can be connected to the connection element, wherein the truncated cone surfaces and the engagement element are tightened the one to the other using a suitable tightening torque.

8 Claims, 6 Drawing Sheets

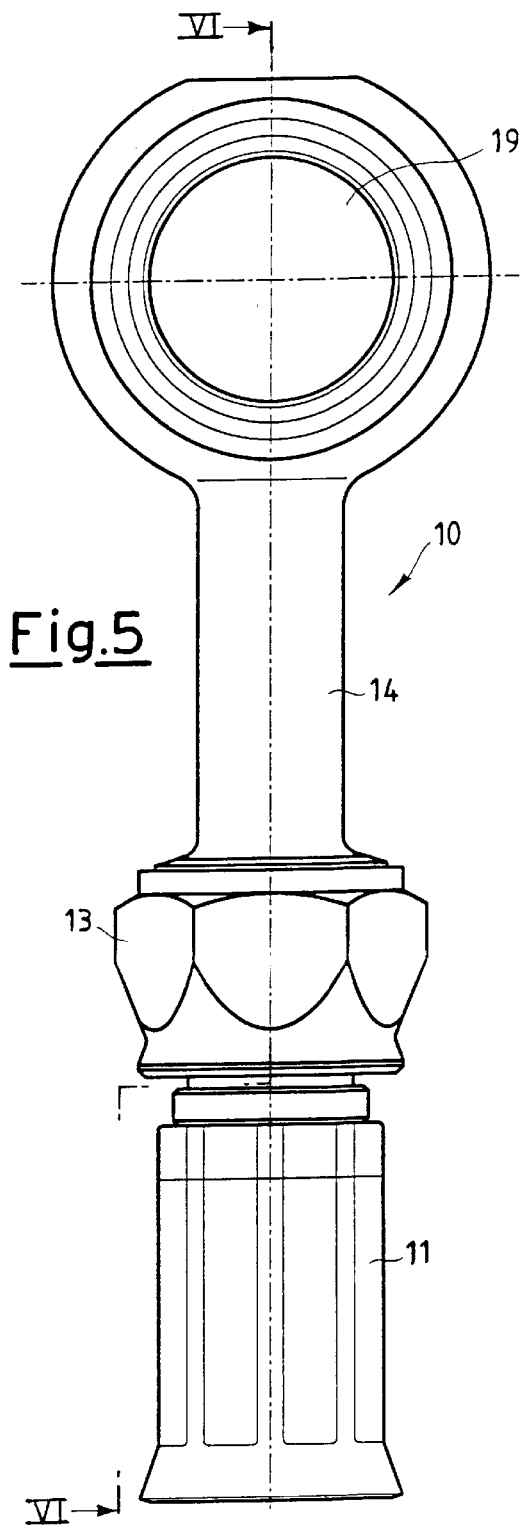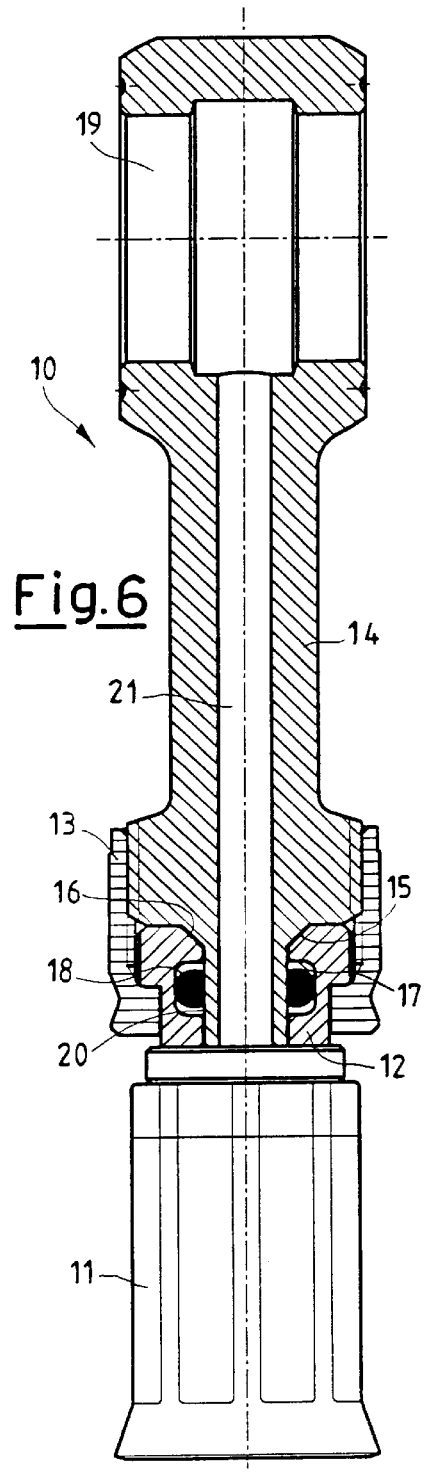

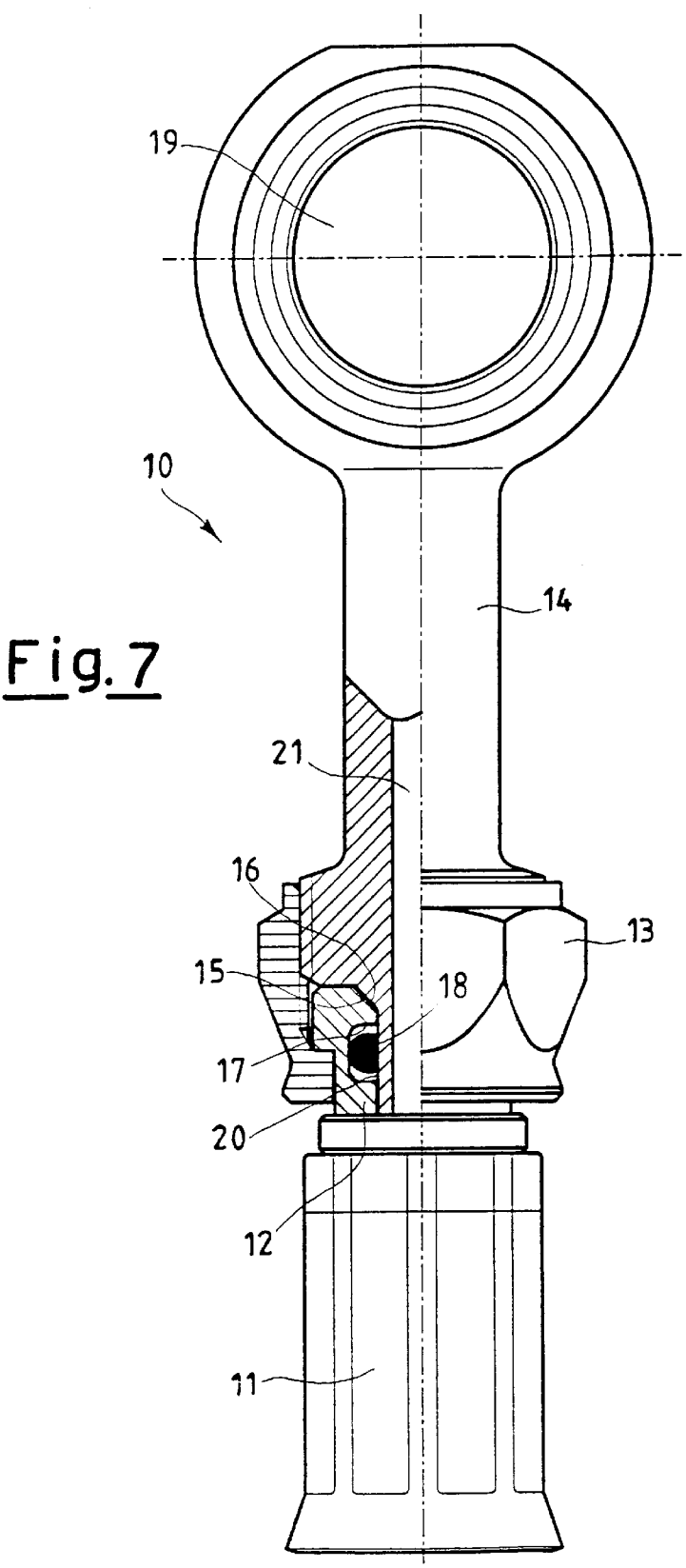

US 6,568,718 B1

JUNCTION FOR FLEXIBLE TUBE FOR HIGH PRESSURE FLUIDS

BACKGROUND OF THE INVENTION

1. Field of the Invention

The present invention relates to a junction for a flexible tube for high pressure fluids.

2. Prior Art

In the field of junctions for flexible tubes for high pressure fluids, such as, for example, fluids used in braking systems, it is known to couple an end element to the connection element of the flexible tube, using specific terminals for each application or type of junction.

However, in most situations, it appears to be preferable to provide for the possibility of dismantling and attaching standard terminals to the flexible tube and not specific terminals for each type of tube.

This is particularly important in the case of an accident where, due to the effect of the crash or of any other cause, the terminal becomes deformed or breaks, forcing the technician to replace the part.

THE SUMMARY OF THE INVENTION

The objective of the present invention is, therefore, that of creating a junction for a flexible tube for high pressure fluids which allows the use of standard terminals and their possible reuse in the case of modifications or otherwise.

Another particular objective of the present invention is that of creating a junction that guarantees greater safety with regards to its performance of hydraulic tightness and is therefore safe and reliable in all situations.

These and other objectives are achieved by a junction for a flexible tube for high pressure fluids, to which reference should be made for sake of brevity.

Further features of the invention are defined in the claims attached to the present patent application.

BRIEF DESCRIPTION OF THE DRAWINGS

Further objectives and advantages of the present invention will be clear from the following description and drawings attached, provided purely as an explicative and not limitative example, in which:

FIG. 5 is a side elevation view of the junction for flexible tubes for high pressure fluids according to a further embodiment of the present invention;

FIG. 6 is a view, according to section VI—VI of FIG. 5, of the junction according to the present invention;

FIG. 7 is a partial section view of the junction of FIG. 5; and

DETAILED DESCRIPTION OF THE PREFERRED EMBODIMENT

Figure 8:
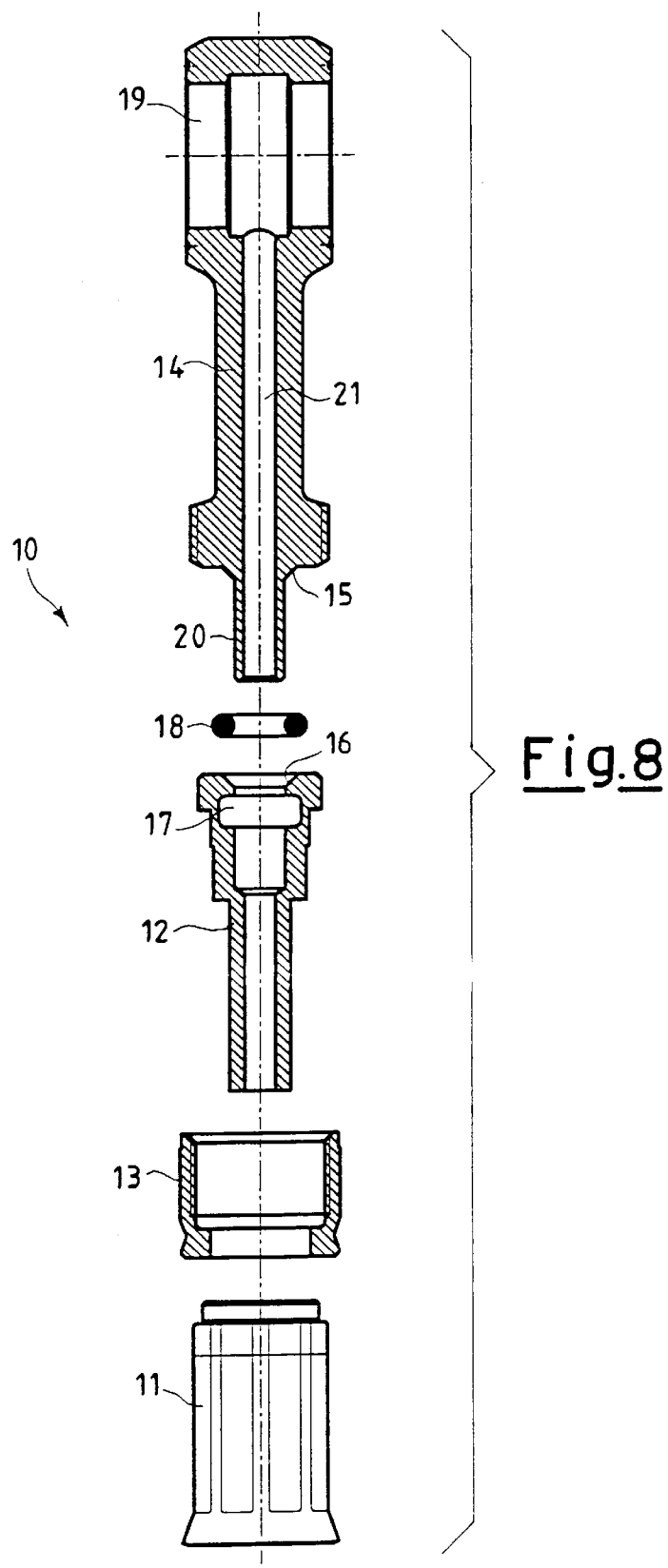
FIG. 8 is a view, in an exploded section of the junction of FIG. 5.

With special reference to FIGS. 5–8, the junction for flexible tubes for high pressure fluids, according to a first embodiment of the present invention is indicated globally with the reference numeral 10.

Junction 10 includes a sleeve 11, pressed down onto the flexible tube, in such a way as to create the coupling with a connection element 12 of the flexible tube; furthermore, a female rotating threaded connection element 13 is connected to the connection element 12, in such a way as to create a single body.

The connection element 12 of the flexible tube can also be coupled with a threaded end element 14, which includes an eye 19 for the connection of the fluid under pressure, passing through the channel 21, to a suitable actuator.

To that end, the end element 14 presents an external threaded portion which is connected to the corresponding internal threaded portion belonging to the rotating female connection 13.

The end element 14 and the connection element 12 are connected through the coupling of an initial truncated cone surface 15, to be found on the end element 14 with a second truncated cone surface 16, to be found on the connection element 12.

More specifically, the truncated cone surface 15, to be found under the end element 14 faces outwards, while the truncated cone surface 16, to be found on the connection element 12, faces inwards.

These truncated cone surfaces 15 and 16 are locked between themselves using a suitable tightening couple which is created by screwing the end element 14 to the inside of the threaded rotating connection 13.

Furthermore, within the connection element 12 a circular slot 17 can be found, suitable to fit an O-Ring gasket 18, made from a material resistant to high pressure fluids.

The function of the O-Ring 18 is that of supplying a further safety hydraulic seal, considering in particular the fact that the O-Ring gasket 18 rests on an external surface 20 of the end element 14.

The functioning of the junction for flexible tubes for high pressure fluids according to the invention is briefly illustrated in the following of the present description.

It shall be first of all noted that the hydraulic seal between the end element 14 and the connection element 12 is guaranteed by the coupling of the first truncated cone surface 15, provided on the end element 14 with the second truncated cone surface 16, located on the connection element 12.

In fact, the threaded coupling between the end element 14 and the corresponding rotating female connection 13 allows for the truncated cone surfaces 15 and 16 to be tightened together.

Furthermore, junction 10 presents a second seal system which allows for double safety, obtained through the presence of the O-Ring 18, interposed between the sleeve 11 and the area where the coupling of the truncated cone surfaces 15 and 16 have been verified.

Figure 1:
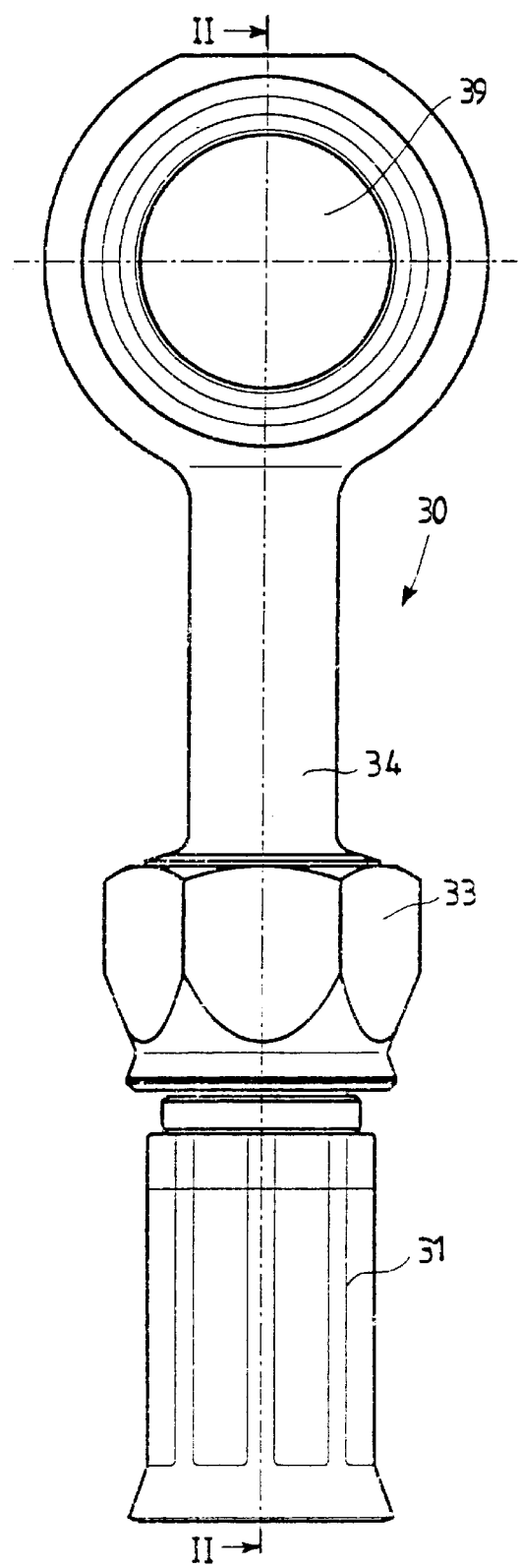
FIG. 1 is a side elevation view of the junction for flexible tubes for high pressure fluids, according to the first preferred embodiment of the present invention.
Figure 2:
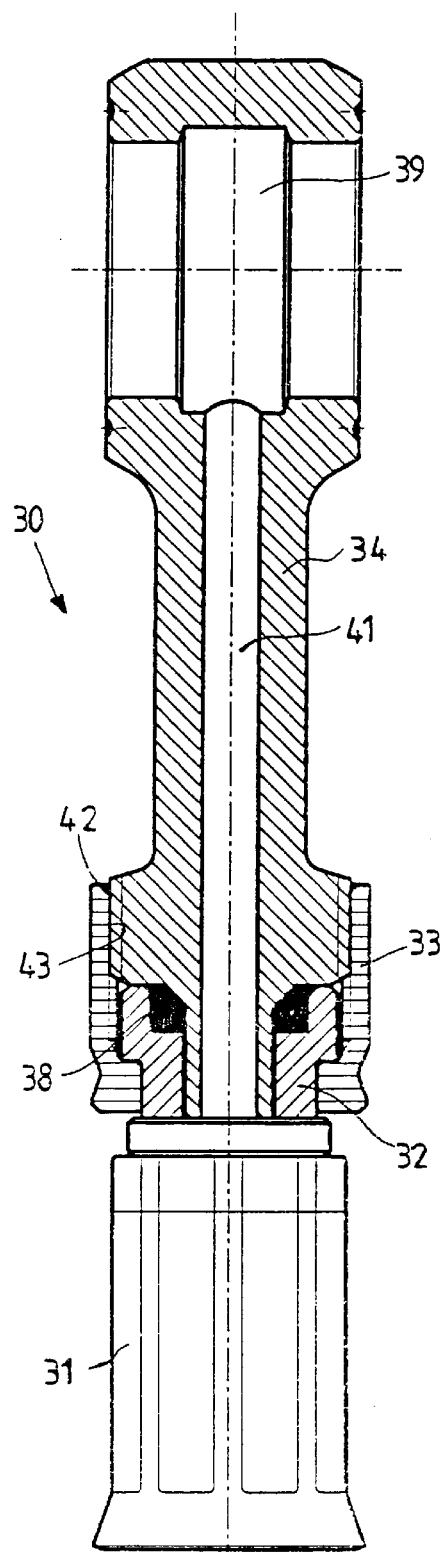
FIG. 2 is a view, according to section II—II of FIG. 1, of the junction according to the present invention.
Figure 3:
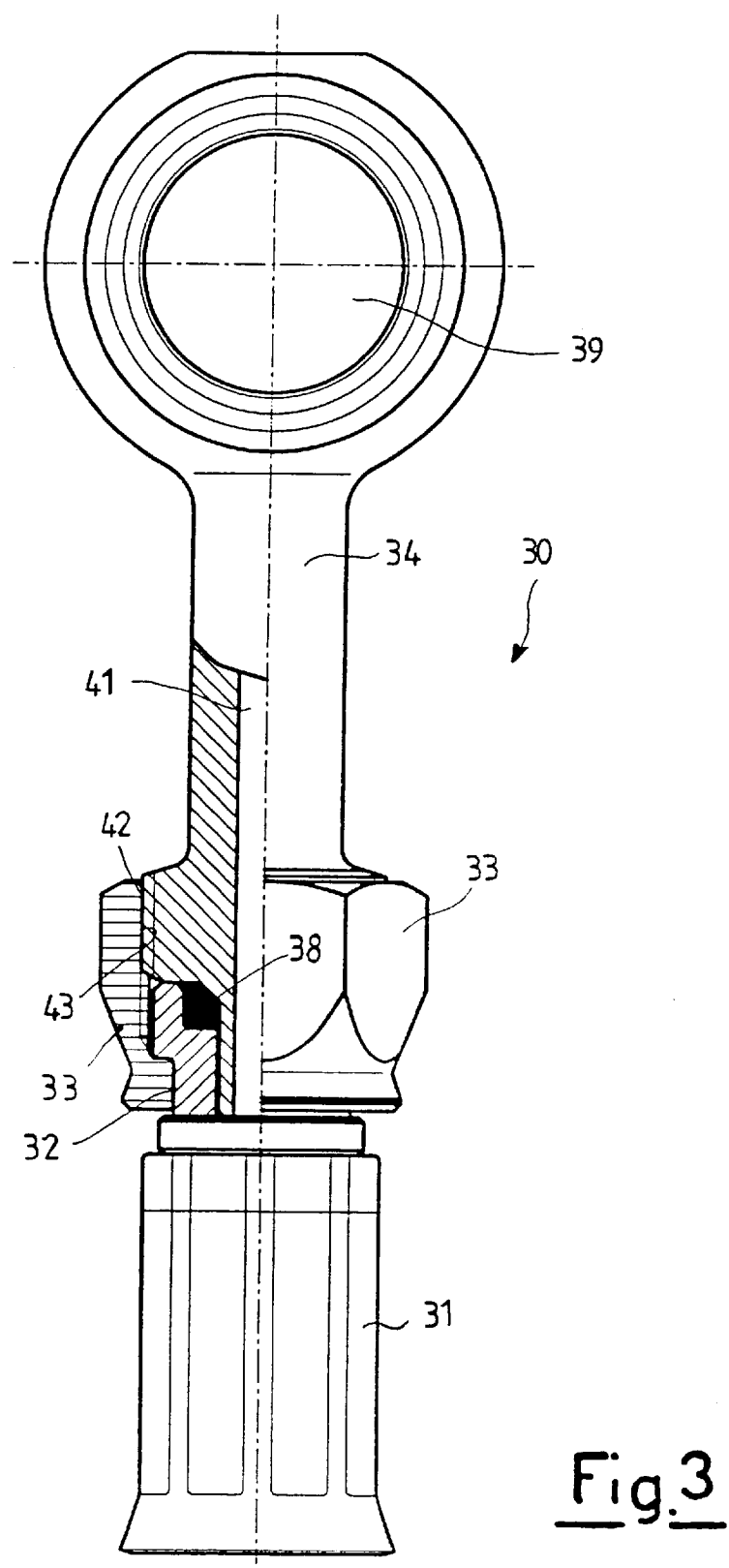
FIG. 3 is a partial section view of the junction of FIG. 1.
Figure 4:
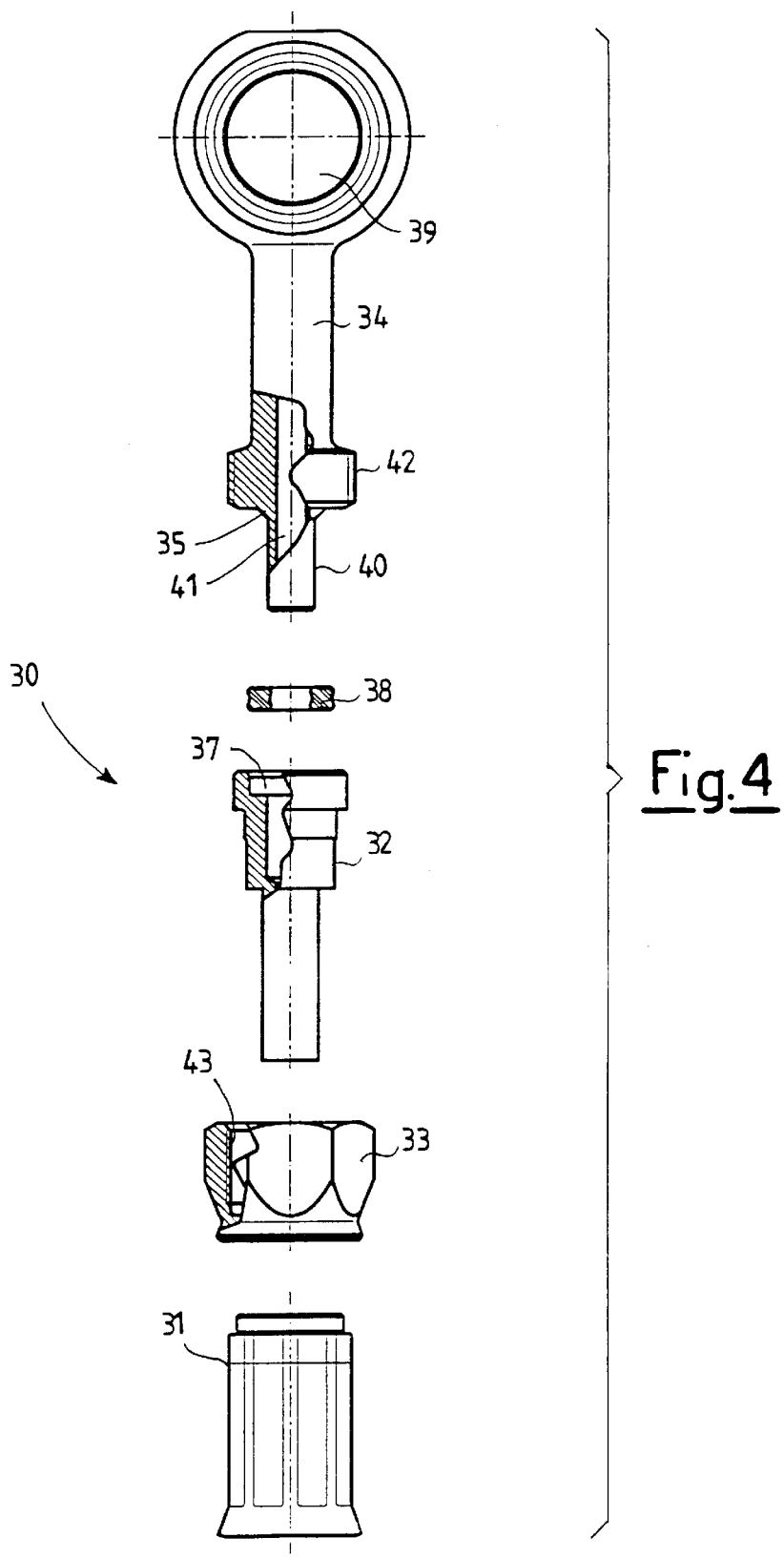
FIG. 4 is a view, in an exploded section of the junction of FIG. 1.

Finally, the thread coupling between the end element 14 and the corresponding female connection 13 allows for replacement of the end element 14 with another terminal according to requirements, Now, with particular reference to FIGS. 1–4, the junction for flexible tubes for high pressure fluids, according to the further embodiments of the present invention, is globally indicated with the reference numeral 30.

Junction 30 comprises a sleeve 31, pressed down onto the flexible tube, in such a way as to carry out the coupling with a connection element 32 of the flexible tube.

Furthermore, a rotating female threaded connection 33 is connected to the connection element 32 in such a way as to create a single body.

The connection element 32 of the flexible tube can also be connected to a threaded end element 34, which presents an eye 39 for the connection of the fluid under pressure passing through the channel 41 to a suitable actuator.

In order to create the coupling between the connection element 32 and the threaded end element 34, the end element 34 itself presents an external threaded portion 42 which is connected to a corresponding internal threaded portion 43, belonging to the rotating female connection 33.

Within the connection element 32 a circular hollow space 37 is provided, aimed at holding a seal gasket 38 made from a material resistant to the fluid under high pressure.

The function of the seal gasket 38 is to provide a special safety hydraulic seal.

The end element 34 and the connection element 32 are connected between themselves through the coupling of a truncated cone surface 35, located on the end element 34 with the seal gasket 38, inserted internally within the circular hollow space 37 of the junction element 32.

The truncated cone surface 35 is tightened with the seal gasket 38 using a suitable tightening couple which is created by screwing the end element 34 to the rotating threaded connection 33.

The truncated cone surface 35, located on the end element 34, faces outwards in order to couple with the seal gasket 38.

Portion 40 of the end element 34 is inserted within the connection element 32.

The operation of the junction for flexible tubes for high pressure fluids, as per FIGS. 5–8 of the invention, is briefly illustrated after this present description.

The hydraulic seal between the end element 34 and the connection element 32 is guaranteed by the coupling of, the truncated cone surface 35, located on the end. element 34 with the seal gasket 38, inserted within the circular hollow space 37 of the connection element 32. This seal is perfected with the intervention of the rotating female connection 33.

Infact, the threaded coupling between the end element 34 and the corresponding rotating female element 33 allows for the tightening betwen them of the truncated cone surface 35 and the seal gasket 38.

The threaded coupling between the end element 34 and the corresponding rotating female connection 33 also allows for the replacement of the end element 34 with another terminal, according to requirements.

It is sufficient to unscrew the end element 34 of the rotating female connection 33 and replace it with another terminal.

From the description above the features are clear of the connection for flexible tubes for high pressure fluids, which is the subject of the present invention, just as the advantages do.

A connection according to the present invention is particularly advantageous in braking systems as it complies with all parameters required by the SAE J 1401 and FMV SS 106 regulations (the latter normally called DOT).

As previously anticipated, the connection of the invention may be assembled and dismantled, for example it may be recovered, more than once throughout its life. cycle and can be interchanged, as a type of terminal, within a wide range of configurations.

The invention is especially suitable for the creation of a PTFE twisted and personalised brake tube, in a wide range of materials and approved according to DOT norms.

Furthermore, the invention can be applied universally as it provides the possibility of using recoverable terminals according to the products of any company, for example the Aeroquip standard.

It is clear that numerous variants can be carried out to the junction for flexible tubes for high pressure fluids, subject of the present invention, without leaving behind the principles of novelty rooted within this inventive idea.

Finally, it is clear that in the practical execution of the invention the materials, the shapes and the sizes of the details illustrated may be any at all according to the requirements and they may be replaced with others that are technically equivalent.

what is claimed is:

1. A junction for a flexible tube for high pressure fluids, comprising a sleeve (11, 31) pressed down onto said flexible tube, a connection element (12, 32) of said flexible tube for coupling with said sleeve (11,31), wherein a rotating female threaded element (13, 33) is connected to said connection element (12, 32), said connection element (12, 32) of said flexible tube being associated with a threaded end element (14, 34), wherein a hydraulic seal is formed between said threaded end element (14, 34) and said connection element (12, 32), said hydraulic seal being formed by the coupling of truncated cone surfaces (15, 35), that are present on said threaded end element (14, 34) which has a connection means that is associated with said connection element (12), wherein said truncated cone surfaces (15, 35) and said connection means are tightened together using a suitable tightening coupling wherein said connection means that is associated with said connection element (12) comprises said truncated cone surface (15) and a second truncated cone surface (16) which is present on said connection element (12), said connection element (12) having a circular hollow space (17) adapted for holding an O-ring gasket (18) wherein said O-ring gasket (18) rests on an external surface (20) of said end element (14), and consists of a material resistant to high pressure fluid which forms a further hydraulic safety seal fluid with the aim of a further safety hydraulic seal wherein said truncated cone surface (15) and said second truncated cone surface (16) are tightened together using a suitable tightening coupling.

2. A junction for flexible tubes, according to claim 1, in which the threaded end element (14) presents an external threaded portion combined with a corresponding internal threaded portion belonging to said rotating female threaded element (13), wherein said threaded element allows the truncated core surface (15) to be tightened to said second truncated cone surface (16) and wherein said connection element (12) having a circular hollow space (17), adapted for holding an O-ring gasket (18) consists of a material resistant to high pressure fluid in order to provide a further hydraulic safety seal and wherein said O-ring gasket (18) rests on an external surface (20) of said threaded end element (14).

3. A junction for flexible tubes, according to claim 1, in which an O-Ring gasket (18) is interposed between said sleeve (11) and the area in which the coupling of said truncated cone surface (15) and said second truncated cone surface (16) occurs.

4. A junction for flexible tubes, according to claim 1, wherein said truncated cone surface (15), located on said threaded end element (14) faces outwards while said second truncated cone surface (16), located on said connection element (12), faces inwards.

5. A junction for flexible tubes, according to claim 1, wherein said means of connection with said truncated cone surface (35) are comprised of a seal gasket (38), associated to said connection element (32), where said truncated cone surface (35) and said seal gasket (38) are tightened between themselves by a suitable tightening couple.

6. A junction for flexible tubes, according to claim 5, wherein said end element (34) presents an external threaded portion which connects to a corresponding internal threaded portion belonging to said rotating female threaded connection (33), wherein such a connection allows for the tightening between themselves of said truncated cone surface (35) and said seal gasket (38).

7. A junction for flexible tubes, according to claim 5 or 6, in which said seal gasket (38) is inserted within a circular hollow space (37) belonging to said connection element (32).

8. A junction for flexible tubes, according to claim 7, wherein said truncated cone surface (35), located on said end element (34) faces outwards, in order to couple with said gasket seal (38).

* * * * *